LOCOMOTIVE CARRIED APPARATUS

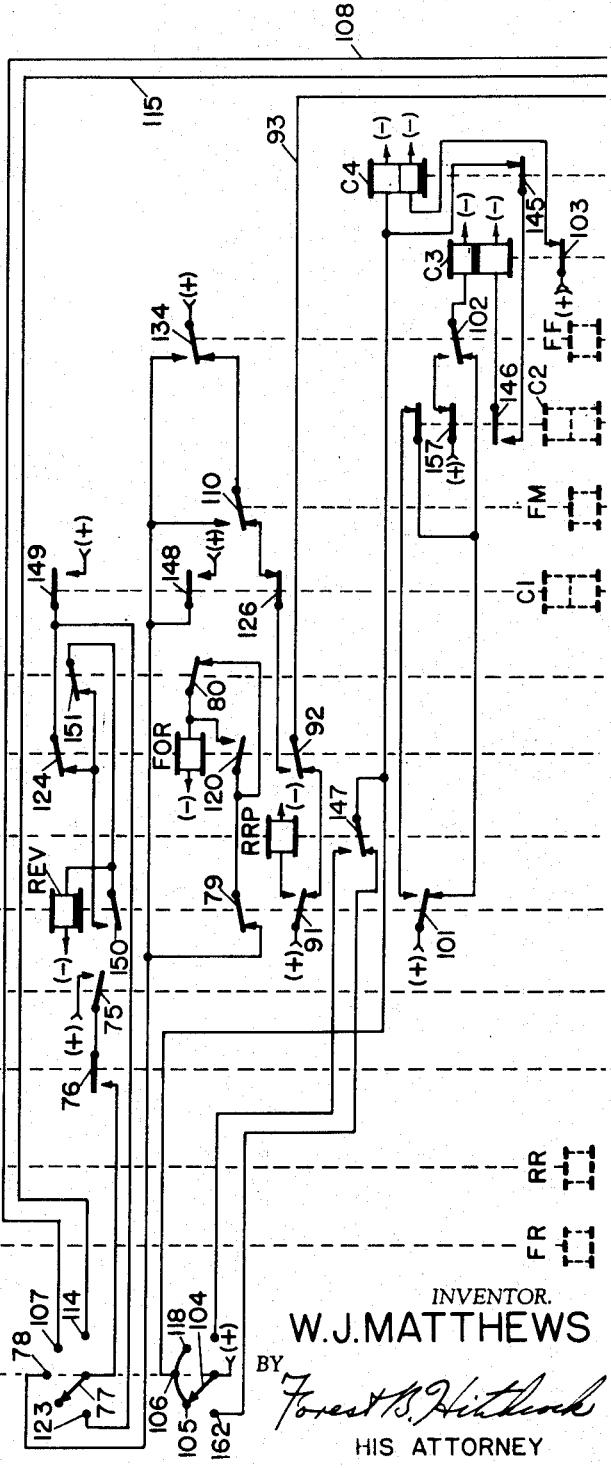

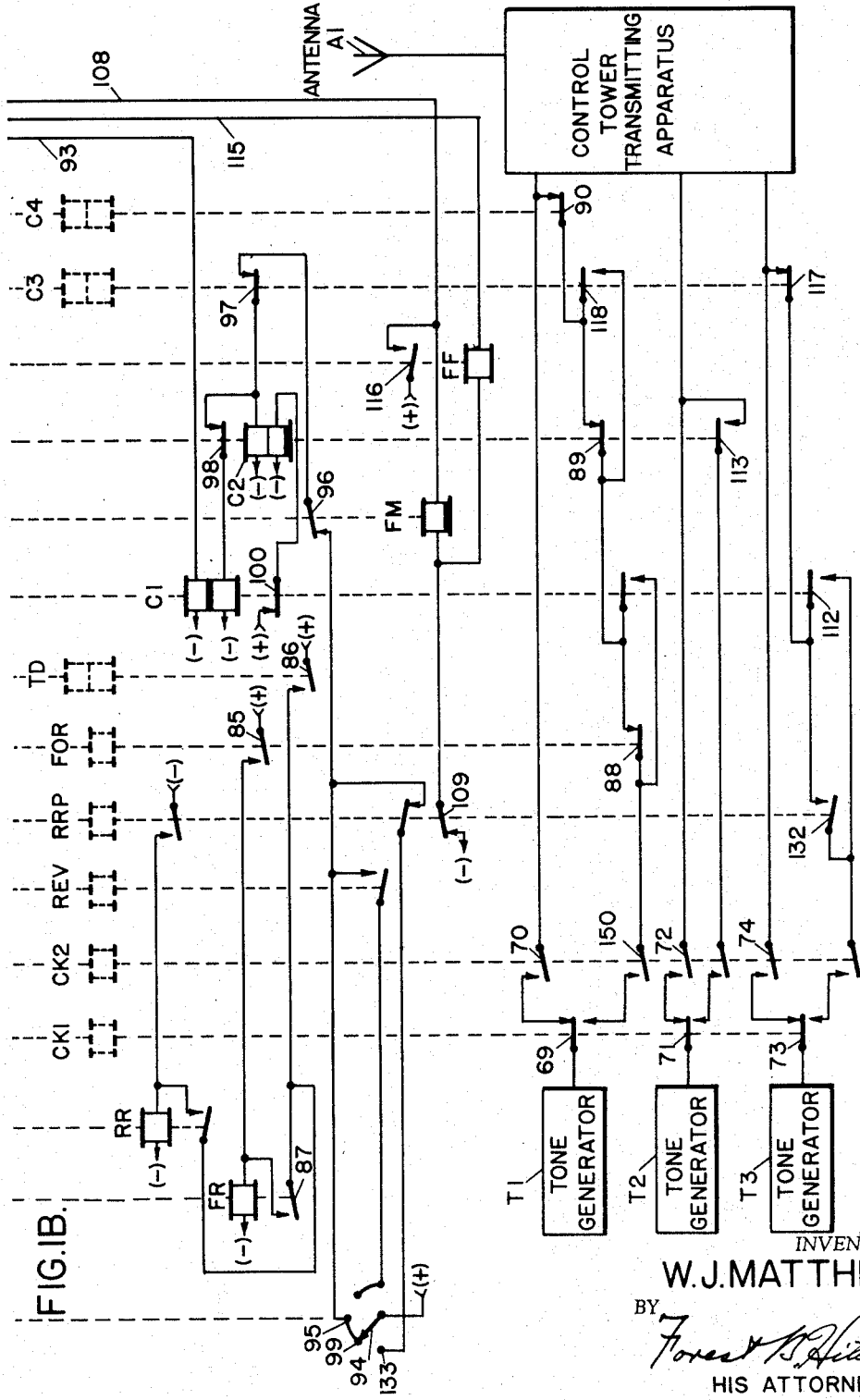

DETECTION RELAY SEQUENCE TABLE

| LOCOMOTIVE FUNCTION | STEP NO. | CONDITION OF DETECTION RELAYS T | | |
|---|---|---|---|---|
| | | LT1 | LT2 | LT3 |
| OFF | 1 | O | O | O |
| CIRCUIT CHECK | 2 | + | + | + |
| SLOW | 3 FORWARD | + | O | O |
| SLOW | 3 REVERSE | O | O | + |
| MEDIUM SLOW | 4 | + | O | + |
| MEDIUM | 5 | O | + | + |
| MEDIUM FAST | 6 | + | + | O |
| FAST | 7 | O | + | O |

+ = ENERGIZED
O = DEENERGIZED

INVENTOR.
W. J. MATTHEWS
BY
HIS ATTORNEY

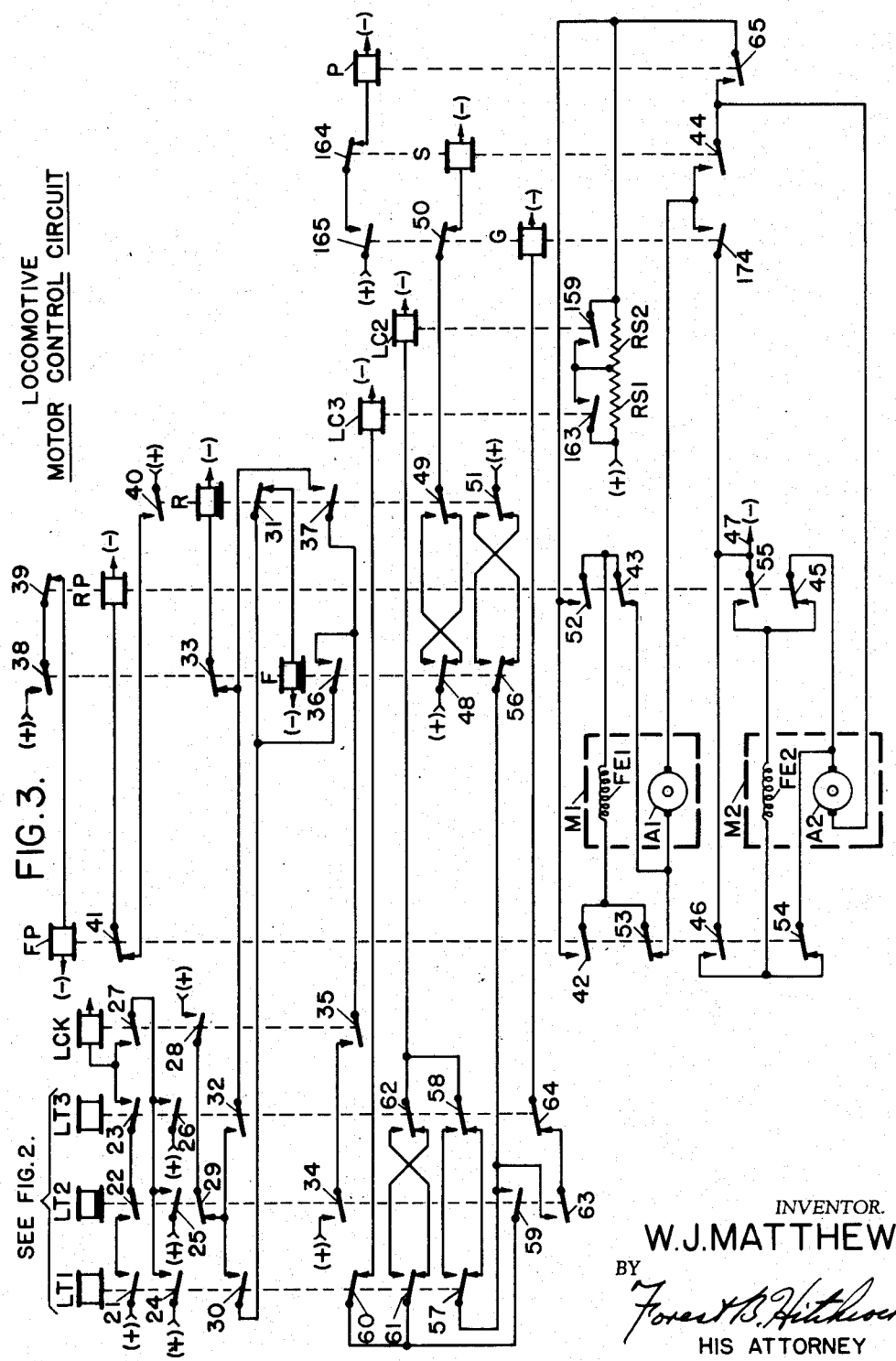

United States Patent Office 3,140,068
Patented July 7, 1964

3,140,068
REMOTE CONTROLLED LOCOMOTIVE
CONTROL SYSTEM
William J. Matthews, Rochester, N.Y., assignor to
General Signal Corporation
Filed Dec. 11, 1957, Ser. No. 702,056
15 Claims. (Cl. 246—167)

This invention relates to a control system for governing the operation of a remotely controlled locomotive and more particularly relates to an improved transmission control system for transmitting distinctive controls to an improved receiving apparatus for controlling a trimming locomotive.

In some railroad classification yards, a trimming locomotive is generally employed to push freight cars to an intended destination. In other gravity type classification yards wherein a free rolling freight car utilizes the force of gravity in rolling down an inclined track to reach its intended destination to a respective classification track; there are times when the free rolling cars fail to roll the required distance to their intended destination. In these instances, it is desirable to employ a remotely controlled trimming locomotive operated by a manual control lever in a central control office of the classification yard to complete the task of pushing the cars to their intended destination.

The trimming locomotive is usually kept in a convenient location in the classification yard and is caused to travel in a forward direction to perform a particular given task, and is then returned in a reverse direction to a designated resting place. This is accomplished by an operator in the control tower who is able to view a great portion of the classification yard and the operation of the trimming locomotive. In manually controlling a trimming locomotive from a remote location, it is desirable that the locomotive is initially caused to move forward at a very slow rate of speed as it approaches a car that it is going to push for reasons obvious to those skilled in the art. In returning the locomotive to its resting place it is desirable that it return with the greatest possible speed. There should also be provided an improved means for preventing the reversal of direction of a moving locomotive until after a predetermined time has elapsed in order to prevent a strain on the mechanical and electrical portions of the locomotive and a slipping of the locomotive wheels. In addition to the slow creeping speed which is necessary in approaching a car which is to be pushed, it is also desirable to provide a number of increased forward speeds to provide a greater thrust, or permit the locomotive to reach a far end of the yard in a short period of time. In order to insure that all the functions of the locomotive are able to be controlled by the operator it is important that the integrity of the control system be checked as to all its individual functions prior to each operation of the locomotive.

In accomplishing the above mentioned features, it is important that the control system be reliable in its operation, and provided with a minimum number of controls for providing the maximum number of functions.

This invention proposes to provide an improved control system for remotely controlling a trimming locomotive, which utilizes an improved code control means for controlling the varied functions of the locomotive.

This invention proposes to provide an improved means for incrementally changing the speed of the locomotive without attention on the part of the operator under desired circumstances. It also proposes that the integrity of the control system for the locomotive is intact prior to each operation of the locomotive. It also provides for preventing the operator from reversing the direction of the locomotive without a predetermined time delay, yet permits him to control the locomotive in the same direction without any delay in time if he should inadvertently move the control lever to an off or stop position.

In view of the foregoing, it is an object of this invention to provide a control system for checking the integrity of the locomotive control apparatus prior to controlling the locomotive in either direction.

Another object of this invention is to provide a control system which will under certain conditions successively increase the thrust of the locomotive without attention on the part of the operator.

Another object of this invention is to provide an improved control system which will allow the locomotive to be operated in a forward direction at various intermediate rates of speed in accordance with the position of a remote manual control means.

A still further object of this invention is to provide an improved control means for creating a time delay when controlling the locomotive from one direction to another.

A still further object of this invention is to provide a control system with a time delay feature in reversing the direction of the locomotive yet include a means for preventing said time delay in the control of the locomotive in the event that the operator should inadvertently put the control lever to an off position and then quickly move the control lever for controlling the locomotive in the same direction.

Another object of this invention is to provide an improved control system utilizing a code system for controlling the various functions of the locomotive.

Other objects, purposes and characteristic features of the present invention will be in part objects from the accompanying drawings and in part pointed out as the description of the invention progresses.

In describing the invention in detail, reference will be made to the accompanying drawings in which like reference characters designate corresponding parts throughout the several illustrations, and in which:

FIGS. 1A and 1B when placed one under the other illustrate diagrammatically the control system for the transmission of distinctive controls according to this embodiment of the present invention;

FIG. 3 illustrates the locomotive carried motor control circuit for this embodiment of the present invention;

Figures 2, 4:
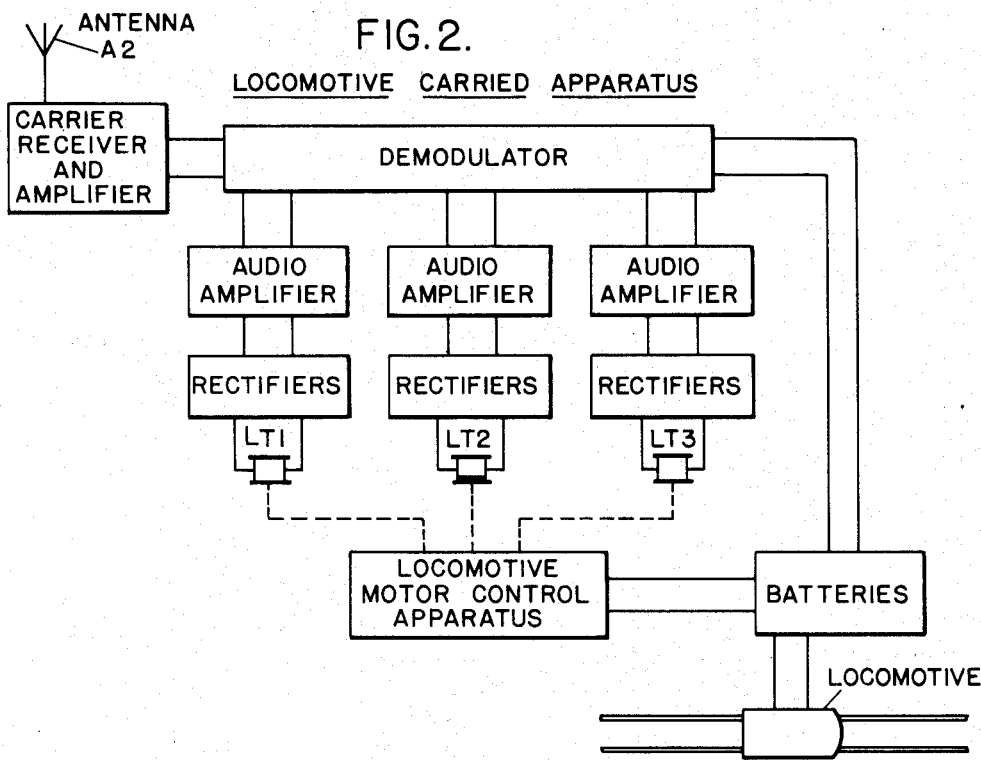
FIG. 2 illustrates in block form a typical receiving control organization located on the locomotive.
FIG. 4 illustrates the code used for the transmission of the controls for operating the locomotive.

For the purpose of simplifying the illustrations and facilitating in the explanation thereof, the various parts and circuits constituting this embodiment of the present invention have been shown diagrammatically and certain conventional illustrations and block diagrams have been employed, the drawings having been made more with the purpose of facilitating the disclosure of the present invention as to its proposals and mode of operation rather than for the purpose of illustrating a specific construction and agreement of parts that are employed in practice. Thus, various relays and their contacts are illustrated in the conventional manner, and symbols are used to indicate the connections to terminals of batteries instead of showing all of the wiring connections to such terminals.

The symbols (+) and (—) are employed to indicate the positive and negative terminals respectively of suitable batteries or other sources of direct current.

FIGS. 1A and 1B show the apparatus located in the control office for governing the movement of the locomotive. The transmitting apparatus for transmitting signals through the antenna A1 is shown in block form and is assumed to contain a conventional means for transmitting a carrier wave.

The tone generators T1, T2, and T3 are each capable of modulating the carrier wave of the transmitter with a different frequency. The carrier wave is capable of being modulated by the tone generators T1, T2, and T3 either separately or simultaneously in any combination. Each of the plurality of modulations by a distinct combination of frequencies provides a code for controlling individual functions of the locomotive.

Referring to FIG. 2, the receiving apparatus is illustrated in block form and comprises an antenna A2 for receiving the transmitted modulated tones. The output of the carrier receiver is amplified and demodulated. The output of the demodulator is fed to the tuned audio amplifiers each of which is distinctively tuned to receive a respective transmitted modulated carrier wave which results in the energization of a distinctive detection relay LT1, LT2, and LT3. Specifically, the relay LT1 is energized in response to a carrier wave modulated by the tone generator T1, the relay LT2 is energized in response to the reception of a carrier wave modulated by the tone generator T2, and the relay LT3 is energized in response to the reception of a carrier wave modulated by the tone generator T3. As previously mentioned, the relays LT can be individually or simultaneously energized in any particular combination.

FIG. 4 shows the various code combinations of tone frequency modulation as detected by the position of the LT relays for controlling the locomotive in a definite direction and at distinctive rates of speed. From FIG. 4 it is apparent that the locomotive is deenergized and standing still when all the LT detection relays are in a deenergized condition, as is the case when the carrier wave is not modulated by any of the frequencies of the tone generators T. The integrity of the control apparatus is checked in response to the picking up of each of the detection relays LT1, LT2, and LT3 in response to the simultaneous modulation of the carrier wave by all the tone generator frequencies. FIG. 4 also shows that the locomotive will move forward at a creeping or slow rate of speed with the relay LT1 energized and LT2 and LT3 relays deenergized, and the locomotive will operate in a reverse direction at a slow or creeping rate of speed with the LT1 and LT2 relays deenergized and the LT3 relay energized. The increments of speed which are illustrated in various code combinations of energized and deenergized LT detection relays are applicable to both the forward and reverse direction of the locomotive. It should be pointed out that this invention contemplates the use of more code combinations for providing a greater number of individual functions, but for the sake of simplicity of disclosure, this invention provides that the carrier wave be modulated by only 3 distinct frequencies as illustrated.

In FIG. 1A a control lever LV is provided to selectively apply a code combination of distinctive modulated tones to the transmitting apparatus in a manner which will be described in detail as the description of the invention progresses. The lever LV can be any conventional type of manual control which remains in its last operated position. The lever LV (see FIG. 1A) is adapted to be positioned in an "Off" position, a "Slow" position for controlling the locomotive at a slow or creeping speed in a forward direction, a "Medium" position for controlling the locomotive at a medium rate of speed in a forward direction, and a "Fast" position for controlling the locomotive at a fast rate of speed in a forward direction. The lever LV is also provided with a position "Reverse" for controlling the locomotive in a reverse direction, which positioning also results in the incremental change of speed as provided by this embodiment of the invention.

*Locomotive Carried Apparatus*

The locomotive carried apparatus shown in FIG. 2 also comprises the locomotive motor control apparatus which is suitably controlled by the detection relays LT1, LT2, and LT3 as will be hereinafter described in detail.

Referring to FIG. 3, the locomotive motor control circuit is illustrated diagrammatically. The motors M1 and M2, having respective field windings FE1 and FE2 and respective armatures A1 and A2, are assumed to be operably connected to the locomotive wheels for driving the locomotive in either a forward or reverse direction. The motors M1 and M2 are assumed in this embodiment of the invention to be series wound motors and are so connected as to be controlled as a unit.

The relays LC2 and LC3 are provided to increase or decrease the field resistance of the motors M1 and M2 for varying the speed of the locomotive motors M1 and M2 in accordance with a predetermined condition of the motor control selection circuit. A possible control relay P is provided to suitably shift the connection of the motors M1 and M2 from a series to a parallel relationship, thereby increasing their speed and power.

A series control relay S is provided to connect the motors M1 and M2 in series when controlling the locomotive at designated slow and intermediate speeds.

The control relay G when picked up permits the motors M1 and M2 to be connected in parallel relationship and when dropped away it permits the motors M1 and M2 to be connected in series relationship.

The slow drop-away directional relays F and R are provided to operate the motors M1 and M2 in a forward or reverse direction respectively. Relays FP and RP are forward and reverse repeaters of the F and R relays, and are energized in response to the picking-up of their respective F and R control relays.

A relay LCK is provided to initially check the integrity of the locomotive control and communication apparatus and is energized only if the detection relays LT1, LT2 and LT3 are operated simultaneously in response to the demodulated carrier waves transmitted by all the tone generators T1, T2 and T3 respectively.

In describing the detailed circuitry of the present invention, it is deemed advisable to initially describe the motor control circuit on the locomotive, and the manner in which it serves to control the locomotive at varying speeds and in different directions. When the motors M1 and M2 of locomotive are at rest, all of the relays in the locomotive motor control circuit are deenergized and no battery energy is being consumed. In response to the transmission of a forward or reverse control from the control office, as caused by the positioning of the lever LV to a respective forward or reverse position, the relays LT1, LT2 and LT3 are energized simultaneously. The simultaneous picking-up of the three detection relays LT energizes the checking relay LCK by a circuit which extends from (+) and includes front contact 21 of relay LT1, front contact 22 of relay LT2, front contact 23 of relay LT3 and the winding of LCK to (−).

The relay LCK is then stuck in an energized position by a stick circuit which includes a front contact of each one of the LT relays. This circuit extends from (+) and includes either front contact 24, front contact 25, or front contact 26 of the detection relays LT1, LT2 and LT3 respectively, the front contact 27 of relay LCK and the winding of LCK to (−). The relay LT2 has slow drop-away characteristics so that the LCK relay will remain energized for the period of time when the energy is removed from all the LT relays between the reception of the checking code and the reception of a forward or reverse control code, and also to further insure that it will not interrupt the stick circuit for the relays F and R during certain speed increments.

Thus, at this point it is apparent that the relay LCK is picked-up only in response to the picking up of all of the detection relays LT and is held up throughout a forward or reverse control by the energized position of one or more of the detection relays LT. With the relay LCK picked-up, a circuit is completed for energizing either forward control relay F or the reverse control relay R. The pick-up circuit for the relay F extends from (+) and includes front contact 28 of relay LCK, back contact 29 of relay LT2, front contact 30 of relay LT1, back contact 31 of relay R and the winding of relay F to (—).

The relay R is energized by a circuit which extends from (+) and includes front contact 28 of relay LCK, back contact 29 of relay LT2, front contact 32 of relay LT3, back contact 33 of relay F and the winding of relay R to (—).

Once the direction of the locomotive has been established by the picking-up of either an F or an R relay in accordance with the respective code combination of energized LT relays, the relays F or R are held in an energized position by the previously described energizing circuit or by an appropriate stick circuit during the transmission of controls at high rates of speed. The stick circuit for the F relay extends from (+) and includes front contact 34 of relay LT2, front contact 35 of relay LCK, front contact 36 of relay F, back contact 31 of relay R and the winding of relay F to (—). The stick circuit for relay R extends from (+) and includes front contact 34 of relay LT2, front contact 35 of relay LCK, front contact 37 of relay R, back contact 33 of relay F and the winding of relay R to (—). The relays F and R have slow drop-away characteristics so that they will not drop-away between the reception of certain of the various speed control codes when energy momentarily is removed from all the detection relays LT. The stick circuit for the relays F and R which includes the front contact 34 of relay LT2 is provided to insure that a respectively energized F or R relay will not drop-away thereby making it possible for the locomotive to receive a dangerous control code for a high rate of speed in the opposite direction, because as it can be seen from FIG. 4, the picking up of an F or an R relay can only be accomplished by a code which includes the deenergized condition of relay LT2.

It is apparent at this point that the relay LCK must be picked up in order to energize and stick either the relay F or the relay R because of the inclusion of front contact 28 of relay LCK in the energizing circuit, and the front contact 35 of relay LCK in the stick circuit for both the F and R relays. The forward repeater relay FP is energized in response to the picking-up of the F relay by a circuit which extends from (+) and includes front contact 38 of relay F, back contact 39 of relay RP, and the winding of relay FP to (—).

The reverse repeater relay is energized in response to the picking-up of the R relay by a circuit which extends from (+) and includes front contact 40 of relay R, back contact 41 of relay FP and the winding of relay RP to (—).

The energizing of the motors M1 and M2 by the picking-up of the FP relay causes the locomotive to move forward at the slowest rate of speed. The motors are energized for a creeping speed by a circuit which extends from (+) and includes resistors RS1 and RS2, front contact 42 of relay FP, field winding FE1, back contact 43 of relay RP, the armature A1, front contact 44 of relay S, the armature A2, back contact 45 of relay RP, the field winding FE2 and front contact 46 of relay FP to the (—) terminal 47.

The series control relay S which closes its front contact 44 when picked-up is energized by the picking-up of either the F or R relay. This circuit extends from (+) and includes front contact 48 of relay F, back contact 49 of relay R, back contact 50 of relay G and the winding of relay S to (—).

It should be noted that the relay S is picked-up simultaneously with the picking-up of the repeater relays and prior to the energizing of the motors M1 and M2 by the previously described energizing circuit. It is apparent from FIG. 3 that the relay S is energized in response to the picking-up of the reverse relay R for a reverse direction by a circuit which extends from (+) and includes back contact 48 of relay F, front contact 49 of relay R, back contact 50 of relay G and the winding of relay S to (—).

The motors M1 and M2 are energized to drive the locomotive at the slowest rate of speed in a reverse direction by a circuit which extends from (+) and includes the resistors RS1 and RS2, front contact 52 of relay RP, the field winding FE1, back contact 53 of relay FP, the armature A1, front contact 44 of relay S, the armature A2, back contact 54 of relay FP, the field winding FE2 and front contact 55 of relay RP to the (—) terminal 47.

It should be noted at this point that the direction of the locomotive is established at the lowest possible speed by the energizing of the forward control and reverse control relays respectively.

The relay LC2 is energized to operate the locomotive at a medium slow speed in either a forward or reverse direction as governed by the combination of energized detection relays as shown in FIG. 3 by a circuit which extends from (+) and includes either back or front contact 51 of relay R, front or back contact 56 of relay F, front contact 57 of relay LT1, front contact 58 of relay LT3 and the winding of relay LC2 to (—).

The picking-up of the relay LC2 results in the closing of its front contact 159, thereby shunting out the resistor RS2 in the previously described energizing circuit of the motors M1 and M2 thereby increasing the power of the series connected motors M1 and M2.

The picking-up of the relay LC3 by the energized and de-energized combination of detection relays LT as shown in FIG. 4 causes the motors M1 and M2 to drive the locomotive at a speed in accordance with the medium speed designated in FIG. 4. The energizing circuit for relay LC3 extends from (+) and includes the front or back contacts 51 and 56 of relays F and R respectively, front contact 59 of relay LT2, back contact 60 of LT1 and the winding of relay LC3 to (—). The relay LC2 is also energized by this combination of energized and deenergized LT detection relays through back contact 61 of relay LT1 and front contact 62 of LT3. With both the relays LC2 and LC3 picked-up, the resistors RS1 and RS2 in the previously described energizing circuit for the series connected motors M1 and M2 are shunted out through front contact 163 of relay LC3 and front contact 159 of relay LC2, thereby increasing the power of the locomotive to the medium designated speed.

The next increase in speed of the locomotive is accomplished by connecting the motors M1 and M2 in a parallel relationship, thereby providing more power to each of the individual motors. In accordance with FIG. 4 the transmission of a medium fast speed control results in the picking-up of the detection relays LT1 and LT2 and the dropping-away of the detection relay LT3. This condition energizes the parallel control relay G, maintains the relay LC2 energized and deenergizes the relay LC3. The energizing circuit for the relay G extends from (+) and includes the respective front and back contact 51 and 56 of the relays F and R, front contact 63 of relay LT2, back contact 64 of relay LT3 and the winding of relay G to (—). The relay LC3 is deenergized by the opening of back contact 60 of relay LT1; and the relay LC2 is held energized by the front contact 59 of relay LT2, front contact 61 of relay LT1 and the back contact 62 of LT3.

The picking-up of relay G energizes the parallel control repeater relay P by a circuit which extends from (+) and includes front contact 165 of relay G, back contact 164 of relay S and the winding of relay P to (—). The picking-up of G also deenergizes the series control relay S by opening the back contact 50 of relay G in the energizing circuit for relay S, thereby breaking the series connection of the motors M1 and M2. The motor M1 is now energized for a medium fast rate of speed in accordance with the designation in FIG. 4, by a circuit which etxends from (+) and includes resistor RS1, front contact 159 of relay LC2, front contact 42 of relay FP, field winding FE1, back contact 43 of relay RP, back contact 53 of relay FP, armature A1 and front contact 174 of relay G to the (—) terminal 47. The energizing circuit for the motor M2 extends from (+) and includes resistor RS1, front contact 159 of relay LC2, front contact 65 of relay P, armature A2, back contact 45 of relay RP, field winding FE2, and front contact 46 of relay FP to the (—) terminal 47.

It is obvious from FIG. 3 that the motors M1 and M2 are energized for the same rate of speed in a reverse direction by a similar energizing circuit through the front contacts of the reverse repeater relay RP instead of through the front contacts of the forward repeater relay FP.

The "fast" designated speed for the locomotive is controlled by the picking-up of the relay LC3 which serves to shunt out the resistor RS1 in the energizing circuit for each of the parallel connected motors M1 and M2, by the closure of its front contact 163. In accordance with FIGURE 4, the LT1 relay is dropped away and the LT2 relay remains energized for the designated fast rate of speed, thereby picking-up the relay LC3 by completing its energizing circuit at back contact 60 of relay LT1.

From the preceding description of the locomotive motor control circuit, it can be seen that the locomotive is energized for various degrees of tractive effort or speed in accordance with a particular transmitted control. It is also apparent that any desired speed can be maintained or can be successively increased or decreased in accordance with the particular combination of energized and deenergized LT detection relays.

Control Tower Apparatus

Referring to FIGS. 1A and 1B, the apparatus for selectively causing the carrier wave to be modulated by a code combination of frequencies for controlling the LT1, LT2 and LT3 detection relays is located in the control tower and is responsive to the operation of a single manual control lever LV. The lever LV as shown in FIG. 1A is in its "off" position; and, as the output of all of the tone generators T1, T2, and T3 are disconnected from the transmitting apparatus with the lever LV in this position the locomotive is at rest. Relays CK1 and CK2 are provided to initially check the integrity of the control apparatus prior to transmitting a definite control code combination. Relay CK1 is normally energized, and is made slow acting for reasons which will be made apparent as the description of the invention progresses.

Relays FOR and REV are forward and reverse transmission control relays for causing the transmission of respective forward and reverse directional control codes. Relay RRP is a reverse repeater relay, and follows the energization and deenergization of relay REV.

Relay TD is a time delay relay, and is provided with a lower or pick up winding and an upper or knock down winding. With respect to the pick-up winding, the relay TD has slow drop-away characteristics for creating a delay of time between the transmission of a forward directional code and a reverse directional code. This time delay may be for example, twelve seconds. The knock down winding of relay TD acts, under certain conditions, to prevent the delay of time in transmitting a code to operate the locomotive in the same direction that it was being operated by a previously transmitted code, which condition would be caused by an operation of the lever LV from "Reverse" to "Off" and back to "Reverse."

A forward restorer relay FR and a reverse restorer relay RR are provided to selectively restore immediate control to the transmitter without the aforementioned time delay. The respective forward and reverse restorer relays condition the energizing circuit for the knock down winding of the relay TD, to prevent a delay of time under the conditions mentioned above.

The incremental speed control relays C1, C2, C3 and C4 are provided to increase the power and speed of the locomotive motors M1 and M2. The C relays each have two separate windings, one of the windings having normal drop-away characteristics, and the other winding having slow drop-away characteristics. Each of the slow drop-away windings is operable to cause its contacts to drop-away, for example, approximately three seconds after deenergization. The slow drop-away windings control the sequential deenergization of the C relays for increasing the speed of the locomotive independent of the position of the lever LV under certain conditions; and the normal windings serve to insure that the position of the C relays correspond to the position of the lever LV and also to insure that the C relays pick-up in reverse sequence to their dropping-away when operating the lever from a fast to a slower designation.

The relay FM serves to allow the incremental change of speed to progress until the locomotive is traveling at a designated medium speed; and the relay FF serves to allow the incremental change of speed to progress until the locomotive is traveling at its fastest speed.

In describing the detailed circuitry for transmitting distinctive controls to the locomotive receiving apparatus for energizing a particular code combination of LT detection relays, the individual controls for forward speeds of the locomotive will be described separately from the reverse control of the locomotive.

With the lever LV in the designated position "Slow" for controlling the locomotive at a slow rate of speed in a forward direction, the relay CK2 is energized by a circuit which extends from (+) and includes back contact 66 of relay TD, the movable armature 67 and the contact associated with the designation "Slow" of the lever LV, back contact 68 of relay RRP and the winding of relay CK2 to (—). With the movement of the lever LV from its "off" designation to its "Slow" designation the normally energized slow dropping-away relay CK1 is deenergized by the opening of its energizing circuit which normally extends from (+) and includes back contact 66 of relay TD, the lever LV in its "Off" position and the winding of relay CK1 to (—).

Because of the slow drop-away characteristics of relay CK1, there is a "brief moment" when the relay CK2 and the relay CK1 are both energized. During this "brief moment" the integrity of the locomotive control apparatus is checked as previously described. During the time that both relay CK1 and CK2 are picked up, the outputs of all three of the tone generators are connected to the transmitting apparatus. The circuit for connecting the tone generator T1 is completed through front contact 69 of relay CK1, front contact 70 of relay CK2 to the control tower transmitting apparatus. Similarly, the output of the tone generator T2 is connected to the transmitting apparatus through front contact 71 of relay CK1 and front contact 72 of relay CK2 and the output of tone generator T3 is supplied through front contact 73 of relay CK1 and front contact 74 of relay CK2. The time allowed for the dropping-away of relay CK1 in one embodiment of this invention was, for example, approximately one-half of a second.

When the relay CK1 is dropped-away, the forward transmitter directional relay FOR is energized by a circuit which extends from (+) and includes front contact 75 of relay CK2, back contact 76 of relay CK1, armature 77 and contact 78 of lever LV, back contact 79 of relay REV, back contact 80 of relay TD and the winding of relay FOR to (—).

The picking-up of the relay FOR energizes the time delay relay TD by a circuit which extends from (+) and includes back contact 81 of relay REV, front contact 82 of relay FOR and the lower or pick-up winding of relay TD to (—). Once the relay TD is picked-up it remains in that condition by an obvious energizing circuit which includes the contacts 81 and 82 of the relays REV and FOR, respectively.

The picking-up of the relay TD closes an alternate energizing circuit to maintain the relay CK2 in a picked-up condition which circuit extends from (+) and includes front contact 66 of relay TD, back contact 84 of relay CK1, the arm of the lever LV in its "slow" position, back contact 68 of relay RRP and the winding of relay CK2 to (−).

The picking-up of the relay FOR also energizes the forward restorer relay FR by a circuit which extends from (+) and includes front contact 85 of relay FOR and the winding of the relay FR to (−).

The picking-up of relay TD sticks the previously energized relay FR by a circuit which extends from (+) and includes front contact 86 of relay TD, front contact 87 of relay FR and the winding of relay FR to (−). The particular function of the time delay relay TD, and the relays FR and RR will be described in detail as the description progresses.

The picking-up of the relay FOR energizes the relay LT1 by connecting the tone generator T1 to the control transmitter by means of a circuit which extends from tone generator T1 and includes back contact 69 of relay CK1, front contact 150 of relay CK2, front contact 88 of relay FOR, front contact 89 of relay C2, and front contact 90 of relay C4. The locomotive is now operating at the slowest rate of speed in a forward direction in accordance with the appropriate code designation in FIG. 4.

It should be noted at this point, that all the relays C1, C2, C3, and C4 are not only energized with the lever LV in its "Off" position, but also remain energized with lever LV in its "Slow" position. The energizing circuit for relay C1 with the lever in its "Off" position extends from (+) and includes back contact 91 of relay REV, back contact 92 of relay FOR, wire 93 and the upper winding of relay C1 to (−). Although, this circuit is broken when the relay FOR picks-up, as previously described, in response to moving the lever LV to its "Slow" position, the normal winding of relay C1 is maintained energized by an alternate circuit which extends from (+) and includes armature 94 and contacts 95 and 99 of lever LV, back contact 96 of relay FM, front contact 97 of relay C3, front contact 98 of relay C2 and the lower winding of relay C1 to (−). It is obvious that the last mentioned energizing circuit for relay C1 is also effective when the lever LV is in its "Off" position because of the interconnection of contact 99 and 95 of the lever LV. In addition to the energizing circuit which includes the aforementioned contacts 95 and 99 of lever LV, the relay C1 is maintained picked-up by an energizing circuit for its slow drop-away winding which extends from (+) and includes back contact 134 of relay FF, back contact 110 of relay FM, front contact 126 of relay C1, front contact 92 of relay FOR, wire 93 and the slow drop-away winding of relay C1 to (−).

The slow drop-away winding of relay C2 is maintained energized by a circuit which extends from (+) and includes front contact 100 of relay C1 and the slow drop-away winding of relay C2 to (−). The alternate energizing circuit for the normal winding of relay C2, which is effective with the lever LV in either its "Off" or "Slow" position extends from (+) and includes armature 94 and either contact 95 or 99 of lever LV, back contact 96 of relay FM, front contact 97 of relay C3 and the upper winding of relay C2 to (−).

The energizing circuit for the normal winding of relay C3 extends from (+) and includes armature 104 and either contacts 105, 106, or 118 of lever LV, front contact 145 of relay C4, back contact 146 of relay C2 and the lower winding of relay C3 to (−). The alternate energizing circuit for the slow drop-away winding of relay C3 extends from (+) and includes front contact 157 of relay C2, front contact 102 of relay FF and the upper winding of relay C3 to (−). The alternate energizing circuit for the slow drop-away winding of relay C3 extends from (+) and includes back contact 101 of relay REV, back contact 102 of relay FF and the upper winding of relay C3 to (−).

The slow drop-away winding of relay C4 is provided with an energizing circuit which extends from (+) and includes front contact 103 of relay C3 and the winding of relay C4 to (−).

The energizing circuit for the normal winding of relay C4 extends from (+) and includes armature 104, either contact 105 or 106 of lever LV and the upper winding of relay C4 to (−).

When the lever LV is moved to its "Medium" position, the locomotive is caused to incrementally change its speed to a medium slow rate of speed, and subsequently to a medium rate of speed as will be hereinafter described in detail.

When the lever LV is moved from its "Slow" designation to its "Medium" designation, the forward medium speed relay FM is energized by a circuit which extends from (+) and includes front contact 75 of relay CK2, back contact 76 of relay CK1, armature 77 and contact 107 of the lever LV, wire 108, the winding of relay FM and the back contact 109 of relay RRP to (−).

The slow drop-away winding of relay C1 is deenergized in response to the picking-up of the FM relay. As previously stated, the relay C1 "for example" takes approximately three seconds to drop-away after its winding has become deenergized. The energizing circuit for the normal winding of relay C1 was interrupted when the lever LV was initially moved from its "Slow" position to its "Medium" position by interrupting the connection formed by armature 94 and contact 95 of the lever LV. Because of the fact that the relay C1 was held energized by the previously described energizing circuit for its slow drop-away winding, it did not become deenergized until relay FM has picked-up, which caused the interruption of the energizing circuit for the slow drop-away winding of relay C1 at back contact 110 of relay FM. When relay C1 drops-away, after the time interval as previously stated, the output of the tone generator T3 is applied to the transmitting apparatus by the closure of back contact 112 of relay C1. At this point it should be noted that the detection relays LT1 and LT3 are energized and the detection relay LT2 is deenergized, thereby connecting the energizing circuits for motors M1 and M2 for the medium slow rate of speed as hereinbefore described in connection with FIG. 3.

The dropping-away of relay C1 deenergizes the slow drop-away winding of relay C2 by opening its energizing circuit at front contact 100 of relay C1. The energizing circuit for the normal winding of relay C2 had been previously broken by the movement of the lever LV from the "Slow" to the "Medium" position, similar to the interruption of the energizing circuit for the normal winding of relay C1.

The relay C2 is also a slow drop-away relay to the extent that it remains picked-up, for example, approximately three seconds after it is deenergized. The dropping-away of the relay C2 disconnects the output of the tone generator T1 from the transmitting apparatus by opening its front contact 89. Simultaneously, the output of the tone generator T2 is applied to the transmitting apparatus by the closure of back contact 113 of relay C2. In this condition it is apparent that the detection relays LT2 and LT3 of the locomotive carried apparatus are energized, the detection relay LT1 is deenergized and the locomotive has increased its speed by increasing the power to the motors M1 and M2 as previously pointed out in the description of FIG. 3.

It should be noted that the increase of speed from the medium slow to the medium rate of speed occurred without any manual operation whatsoever and provided for a gradual increase to the desired speed, by the initial movement of the lever to the "Medium" position. The movement of the lever LV from the "Medium" position to the "Fast" position energizes the fast forward relay FF by a circuit which extends from (+) and includes front contact 75 of relay CK2, back contact 76 of relay CK1, armature 77 and contact 114 of the lever LV, wire 115, the winding of relay FF and the back contact 109 of relay RRP to (—).

It is apparent that the movement of the lever LV to the "Fast" position interrupted the energizing circuit for the relay FM at contact 107 of lever LV, however, it should be noted that the picking-up of the relay FF provided an alternate energizing circuit for the relay FM which extends from (+) and includes front contact 116 of relay FF, the winding of relay FM and the back contact 109 of relay RRP to (—).

The dropping-away of relay C2 with the relay FF picked-up interrupts the previously described energizing circuit for the slow drop-away winding of relay C3, thereby allowing it to become deenergized. The dropping-away of the relay C3 removes the output of the tone generator T3 from the transmitting apparatus by opening its front contact 117. Simultaneously, the output of the tone generator T1 is connected to the transmitting apparatus by the closure of back contact 118 of relay C3. Thus, at this point it is evident that the locomotive detection relays LT1 and LT2 are energized, and the detection relay LT3 is deenergized, thereby providing for the transmission of a medium fast speed control for energizing the motors M1 and M2 as previously described.

The opening of front contact 103 of relay C3 in its dropped-away position deenergizes the slow drop-away winding of relay C4 by opening its previously described energizing circuit. After the previously stated time interval, the relay C4 is completely dropped-away, thereby opening its front contact 90 in the output circuit for tone generator T1 which results in the deenergization of the locomotive detection relay LT1. The condition of the detection relays LT now correspond to the fast code combination as shown in FIG. 4, and the locomotive motors M1 and M2 are so connected as to be provided with the greatest possible power, as previously described in connection with FIG. 3.

According to the preceding description it can be seen that the transmission control circuit deenergizes the relays C1, C2, C3 and C4 successively at stated time intervals in order to incrementally change the thrust or speed of the locomotive. In decreasing the speed of the locomotive the C relays are energized in the inverse order, that is C4 is first energized with C3, C2 and C1 following successively.

By moving the lever LV from the "Fast" position to the "Medium" position to reduce the speed of the locomotive, the FF relay is deenergized by interrupting its previously described energizing circuit at contact 114 of the lever LV. Simultaneously, the relay C4 is picked-up by completing its previously described energizing circuit for its normal winding at contact 118 of the lever LV. The picking up of the relay C4 causes the transmission of a control for decreasing the power of the motors M1 and M2 to the "Medium Fast" condition in the manner previously described.

In response to the picking up of relay C4 the normal winding of relay C3 is energized by completing the aforementioned energizing circuit at front contact 145 of relay C4. Simultaneously in response to the dropping-away of relay FF, the slow drop-away winding of relay C3 is energized by the closing of back contact 102 of relay FF. The picking up of the relay C3 further reduces the speed of the locomotive to the "Medium speed" designation by the transmission of a code combination of modulated tones for controlling LT detection relays as hereinbefore stated.

At this point, it should be mentioned that if the lever LV were moved from the "Medium" back to the "Fast" position, the relay C3 would drop away prior to the dropping away of relay C4 because relay C4 is held up through the front contact 103 of relay C3, even though the energizing circuits for their normal windings were simultaneously interrupted at lever LV.

By moving the lever LV from the "Medium" position to the "Slow" speed designation, the relay FM is deenergized by the opening of its previously described energizing circuit at contact 107 of the lever LV. In response to the dropping away of the FM relay, the relay C2 is picked up by completing the previously described energizing circuit for its normal winding at back contact 96 of relay FM and also at contact 95 of the lever LV.

The picking up of the relay C2 serves to further decrease the energy to the motors M1 and M2 to the medium slow designation in the manner hereinbefore mentioned. The picking up of the relay C2 energizes the normal winding of relay C1 by completing its previously described energizing circuit at front contact 98 of relay C2. The picking up of relay C1 reduces the speed of the locomotive to its slow or creeping condition in the manner hereinbefore mentioned.

By moving the lever LV to its "Off" position, the relay FOR is deenergized by interrupting its stick circuit at the lever LV which extends from (+) and includes front contact 75 of relay CK2, back contact 76 of relay CK1, armature 77 and contact 78 of lever LV, back contact 79 of relay REV, front contact 120 of relay FOR and the winding of the relay FOR to (—).

Simultaneously, with the dropping-away of relay FOR, the checking relay CK2 is deenergized by interrupting its previously described energizing circuit at the designation "Slow" on the lever LV. The dropping-away of the relay CK2 restores the CK1 to its normally energized condition by a circuit which extends from (+) and includes front contact 66 of the time delay relay TD, back contact 121 of relay CK2 and the winding of relay CK1 to (—).

It is evident that with the picking-up of the relay CK1 after the dropping-away of the relay CK2 that there are no tones being transmitted to the transmitting apparatus, thereby placing the locomotive in a deenergized condition. It should be noted that the dropping-away of the relay FOR deenergized the time delay relay TD by opening front contact 82 of relay FOR in its previously described energizing circuit. As previously mentioned, the time delay relay TD requires approximately twelve seconds to drop its contacts after its lower winding is deenergized.

When the time delay relay TD has dropped-away, the forward restorer relay FR is deenergized by opening its previously described stick circuit at front contact 86 of relay TD.

It is deemed advisable at this time to describe in detail the functions of the relay TD with regard to the control of the locomotive transmitting apparatus. Assuming that lever LV is moved from a forward control position to its "Reverse" position, the relay TD has become deenergized but has not yet dropped-away, and the locomotive had been operating in a forward direction prior thereto; the reverse directional relay REV cannot be immediately energized to transmit controls for operating the locomotive in a reverse direction, because front contact 75 of relay CK2 is included in the pick-up circuit for relay REV, and relay CK2 cannot pick-up to close its front contacts because back contact 122 of relay FR is included in the pick-up circuit for relay CK2 with lever LV in the "Reverse" position, and the relay FR will not be deenergized to close its back contact until the relay TD drops away. This function of the transmitter control circuit will be more apparent by tracing the energizing circuits for the relays REV and relay CK2. With the lever LV in its reverse position, the pick-up circuit for relay CK2 extends from (+) and includes back contact 66 of relay TD, the lever LV in its reverse position, back contact 122 of relay FR and the winding of relay CK2 to (—). The pick-up circuit for relay REV extends from (+) and includes front contact 75 of relay CK2, back contact 76 of relay CK1, armature 77 and contact 123 of lever LV in its reverse position, back contact 124 of relay FOR, back contact 151 of relay TD and the winding of relay REV to (—). Therefore, it is apparent that a quick movement of the lever from a forward to a reverse position will not cause the picking up of relay REV to control the locomotive in the reverse direction until after the period of time has elapsed for the dropping-away of the time delay relay TD and the resultant dropping-away of the forward restorer relay FR. Further assuming that the locomotive has been operating in a reverse direction and the lever LV is moved to a forward position, the relay FOR cannot be picked up until relay TD has dropped away because of the inclusion of back contact 80 of relay TD in the pick-up circuit of relay FOR. As previously pointed out the delay of time between the picking up of the FOR relay and the REV relay insures that the locomotive has come to a complete stop before the motors M1 and M2 are energized in the opposite direction.

Assuming that the lever LV is moved from its "fast" forward designation to its "fast" reverse designation the relay C4 is immediately energized by a circuit which extends from (+) and includes armature 104 of the lever LV, contact 162 of the lever LV in its "reverse" position, back contact 147 of relay RRP and the upper winding of relay C4 to (—). This condition permits the C relays to begin their aforementioned energizing sequence immediately in response to the movement of the lever. In the event the lever LV is moved from its "fast" reverse position to its "fast" forward position the relay C4 is energized by a similar circuit which includes the front contact 147 of relay RRP.

Assuming that the locomotive is being operated in a forward direction and the lever is inadvertently moved to its "Off" position and thereafter moved again back to one of the forward control positions after the relay FOR has dropped-away, but before the dropping-away of the relay TD, the movement of the lever LV from its "Off" position to a forward control position will immediately drive down the relay TD before its normal delayed drop-away time has elapsed. The drive-down circuit for relay TD extends from (+) and includes the armature 125 and one of the forward control contacts of the lever LV, front contact 126 of relay FR, back contact 127 of relay FOR, front contact 128 of relay TD and the upper or drive-down winding of relay TD to (—).

The forceably driving feature of the relay TD to its deenergized position permits the forward directional relay FOR to become immediately reenergized by the closing of back contact 80 of relay TD in the previously described pick-up circuit for relay FOR.

Similarly, if the locomotive had been operating in a reverse direction and the lever is moved to its "Off" position and then back to the "Reverse" position after the dropping-away of relay REV and its repeater RRP, and prior to the dropping-away of the time delay relay TD, the relay TD would be immediately driven to a deenergized position by the drive down circuit which extends from (+) and includes armature 125 and contact 129 of the lever LV in its reverse position, front contact 130 of the reverse restorer relay RR, back contact 131 of relay RRP, front contact 128 of relay TD and the upper winding of relay TD to (—).

From the preceding description it is apparent that the time delay means is rendered ineffective if the locomotive is being controlled traveling in a forward direction and thereafter controlled by moving the lever LV to an "Off" position followed by a movement of the lever LV to a forward control position. Similarly the time delay means is rendered ineffective relative to the "Reverse" control followed by a positioning of the lever LV to the "Off" position and back to the "Reverse" position.

Assuming that the locomotive is at rest with the lever LV in the "Off" position and the lever is subsequently moved to the reverse position, thereby controlling the locomotive in a reverse direction. The checking relay CK2 is energized and the relay CK1 is deenergized similar to the initial operation of the control circuit for controlling the locomotive in a forward direction. The dropping away of the relay CK1 energizes the reverse control relay REV by completing its previously described pick-up circuit. The reverse repeater relay RRP merely repeats the operation of the reverse directional control relay REV and is picked-up by a circuit which extends from (+) and includes front contact 91 of relay REV and the winding of relay RRP to (—).

The picking-up of the reverse control relay REV energizes the time delay relay TD by a circuit which extends from (+) and includes front contact 81 of relay REV, back contact 82 of relay FOR and the lower winding of relay TD to (—).

In response to the picking-up of the relay RRP the output of the tone generator T3 is applied to the transmitting apparatus by the closure of front contact 132 of the relay RRP. According to FIG. 4 the energizing of the detection relay LT3 together with the deenergized condition of relays LT1 and LT2 controls the motors M1 and M2 on the locomotive in a reverse direction as previously mentioned in connection with the description of FIG. 3. Also in response to the picking-up of relay REV the previously described energizing circuit for the upper winding of relay C1 is interrupted at back contact 91 of the relay REV and the relay C1 is deenergized and assumes its dropped-away position approximately three seconds after deenergization. The energizing circuit for the lower winding of relay C1 was interrupted by the movement of the armature 94 of the lever LV from contact 99 of said lever to contact 133 of the lever LV in its reverse position. The dropping-away of the relay C1 after the direction of the locomotive had been established, increases the energy applied to the motors M1 and M2 in the same manner as described in connection with the forward control of the locomotive.

The dropping-away of relay C1 deenergizes the relay C2 to further increase the locomotive speed. The relay C3 is deenergized after the time has expired for dropping-away the relay C2 and the relay C4 is deenergized after the time has expired for dropping-away the relay C3. The relay C4 is dropped-away after a predetermined period of time, similar to the previously mentioned relays C1, C2 and C3.

From the preceding description of the reverse control of the locomotive, it can be seen that the locomotive speed and power is increased in distinct steps automatically without attention on the part of the operator, once the lever LV has been moved to its "Reverse" position.

The manual operation of the lever LV from its "Reverse" to its "Off" position causes relay CK2 to be deenergized by interrupting its energizing circuit at arm 67 of relay LV. The closing of back contact 121 upon the dropping away of relay CK2 closes an energizing circuit for relay CK1. The picking-up of relay CK1 after relay CK2 has dropped-away removes the output of all of the tone generators from the transmitting apparatus. Simultaneously, with the movement of the lever LV to its "Off" position the relay C4 is energized in a manner previously described and the relays C3, C2 and C1 are successively energized in the order mentioned. The relay REV is deenergized in response to the picking-up of relay C1 and the time delay relay TD is deenergized in response to the dropping-away of the relay REV. It should be noted that directional relay REV can be deenergized only after C1 has been energized because of its stick circuit which extends from (+) and includes back contact 149 of relay C1, back contact 124 of relay FOR, front contact 150 of relay REV, and the winding of relay REV to (—). The reverse restorer relay RR is deenergized after the relay TD has assumed its dropped-away position.

Assuming that the lever LV is moved from the "Off" position directly to the forward "Fast" position, the control circuit acts to gradually increase the speed of the locomotive in a forward direction similar to the manner described for the gradual increase of speed of the locomotive by moving the lever LV to the "Reverse" position. It is apparent from FIGS. 1A and 1B that the relay FF is immediately energized by moving the lever LV to the "Fast" position. The relay FM is energized in response to the picking-up of the relay FF and the relay FOR is energized in response to the picking-up of relay FF by a circuit which extends from (+) and includes front contact 134 of relay FF, back contact 79 of relay REV, back contact 80 of relay TD and the winding of relay FOR to (—).

The relay C1 is not deenergized until the relay FOR is picked-up so that the gradual orderly progression of increasing power will be maintained when the relay FOR is picked-up. The relay C1 is dropped-away because the energizing circuit for the upper winding of relay C1, with the relay FOR picked-up, is broken at back contact 134 of relay FF and back contact 110 of relay FM. The interruption of this energizing circuit permits the relay C1, C2, C3 and C4 to be successively deenergized in the manner previously described without any further control of the lever LV. From the preceding description it is apparent that the operator can move the lever to a "Fast" position and the locomotive will gradually, at definite time intervals, increase its power and speed.

The movement of the lever LV from the "Fast" position directly to the "Off" position causes the relay FF to drop-away which deenergizes the relay FM. The relay C4 is energized followed by the successive energization of relays C3, C2 and C1 in the order mentioned. It should be pointed out that the directional relay FOR can be deenergized only after relays FF and FM are deenergized and relay C1 is energized. A plurality of stick circuits as provided for relay FOR, one of which extends from (+) and includes front contact 134 of relay FF, back contact 79 of relay REV, front contact 120 of relay FOR and the winding of FOR to (—); another of which extends from (+) and includes back contact 134 of relay FF, front contact 110 of relay FM, back contact 79 of relay REV, front contact 120 of relay FOR and the winding of relay FOR to (—); and another of which extends from (+) and includes back contact 148 of relay C1, back contact 79 of relay REV, front contact 120 of relay FOR and the winding of relay FOR to (—). Simultaneously with the movement of the lever LV, the relay CK2 is dropped-away which in turn energizes the relay CK1 in the same manner as described for the operation of the lever from the "Reverse" to the "Off" position. The relay FOR, the relay TD, and the relay FR are deenergized in the manner as previously described.

Having described one specific embodiment of a control system for a remotely controlled locomotive, it is desired to be understood that this form is selected to facilitate in the disclosure of the invention rather than to limit the number of forms which the invention may assume, and it is further understood that various adaptations, alterations, and modifications may be applied to the specific form shown to meet the requirements of practice, without in any manner departing from the spirit or scope of the present invention, except as limited by the appended claims.

What I claim is:

1. In a system for controlling a multiple speed locomotive, a prime mover activating means for selectively driving the locomotive in a forward and reverse direction in response to the reception of a carrier wave selectively modulated by a respective code combination of a plurality of distinct frequencies, a transmitting means operable to transmit a carrier wave, a manual lever means operable to be positioned to a forward and reverse designation, a code selection means for causing the transmitted carrier wave to be selectively modulated by a distinct code combination of a plurality of frequencies in accordance with the position of said manually operable means, circuit means responsive to the positioning of the manual lever to a respective forward and reverse designation for causing said carrier wave to be momentarily modulated by all the provided frequencies simultaneously, and an integrity checking means effective to cause the prime mover activating means to operate the locomotive in response to the reception of a respective code combination of frequencies only after the reception of said carrier wave simultaneously modulated by all the provided frequencies.

2. In a control organization for remotely controlling a locomotive from a central control office in a railroad car classification yard, a carrier wave transmitter in said control office, a plurality of tone generators, a manual control means operable to be positioned in a forward and reverse position, a first circuit means for causing all of the said plurality of tone generators to momentarily and simultaneously modulate the transmitted carrier wave with their respective frequencies in response to the positioning of said manual control means to either the forward or reverse position, a second circuit means for selectively causing the transmitted carrier wave to be modulated by a distinct code combination of frequencies from said tone generators as determined by the respective forward and reverse position of said manual control means, a carrier wave receiving apparatus on said locomotive, a plurality of detection means associated with the receiver, each of said detection means being actuated in response to a distinctive modulated frequency of a respective tone generator, a locomotive driving means operable to be selectively energized for driving the locomotive in either a forward or reverse direction, an integrity checking means activated only in response to the simultaneous actuation of all said detection means, and a locomotive control circuit means responsive to the reception of a distinct code combination as detected by the actuation of respective detection means and the activated condition of said integrity checking means for selectively energizing said locomotive driving means.

3. In a control system for remotely controlling a locomotive from a control office, a manual control lever at the control office capable of being positioned in a forward, off and reverse position, communication means between the control office and the mobile locomotive for controlling the operation of the locomotive, said communication means comprising a transmitter at the control office and a receiver on the locomotive, a forward directional relay energized in response to the forward positioning of the lever for causing the said transmitter to transmit a forward control to the locomotive, a reverse directional control relay responsive to the positioning of the lever to its reverse position for causing the transmitter to transmit a reverse directional control to the locomotive, a time delay relay having slow drop away characteristics, said time delay relay being energized in response to the picking up of a respective forward and reverse directional control relay for delaying the response of the other directional control relay to the positioning of the lever to its other respective designation, and a circuit means including a respective forward and reverse restorer relay for deenergizing the time delay relay in response to the positioning of the lever from one directional designation to the off designation and back to the same directional designation for causing a directional control relay to be immediately energized in point of time in response to the positioning of the manual control lever to the same directional designation.

4. In a system for controlling a multiple speed locomotive having a prime mover activating means for selectively driving the locomotive in a forward and reverse direction at distinctive rates of speed in response to the reception of a carrier wave selectively modulated by one or more separate frequencies, a transmitting means operable to transmit a carrier wave modulated by one or more separate frequencies for selectively controlling the locomotive prime mover activating means, a manually operable means, a code selection means responsive to said manually operable means for causing the transmitted carrier wave to be selectively modulated by a distinct code combination of a plurality of frequencies, a circuit means for causing said carrier wave to be momentarily modulated by all the provided frequencies simultaneously, and integrity checking means on the locomotive responsive to the reception of said carrier wave simultaneously modulated by all the provided frequencies for rendering the locomotive operative to be selectively driven by the subsequent reception of a respective code combination of less than all of the provided frequencies, and a transmitter control circuit means for causing the transmitter carrier wave to be successively modulated at stated time intervals by distinctive code combination of frequencies less than all of the provided frequencies for incrementally changing the speed of the locomotive.

5. In a control organization for remotely controlling a trimming locomotive from a central control office in a railroad car classification yard, a carrier wave transmitter in said control office, a plurality of tone generators, a manual control means operable to be positioned to a forward and reverse designation, a first circuit means for causing all of said plurality of tone generators to momentarily and simultaneously modulate the carrier wave with their respective frequencies in response to the positioning of said manual control means to either the forward or reverse designation, a second circuit means for selectively causing the transmitted carrier waves to be successively modulated at definite time intervals by distinct code combinations of frequencies from said tone generators as determined by the respective forward and reverse position of said manual control means, a carrier wave receiving apparatus on said locomotive, a plurality of detection means associated with the receiver, each of said detection means being actuated in response to a distinctive modulated frequency of a respective tone generator, a locomotive driving means operable to be selectively energized for driving the locomotive in either a forward or a reverse direction, an integrity control checking means activated only in response to the simultaneous actuation of all said detection means, and a locomotive control circuit means responsive to the reception of said successively transmitted distinct code combinations as detected by the actuation of respective detection means and the activated condition of said integrity checking means for energizing said locomotive driving means at distinct increments of successive speeds.

6. In a control system for remotely controlling a locomotive from a central control office, a carrier wave transmitter in said control office, a plurality of tone generators, a manual control lever operable to be positioned in a forward and reverse position, a first circuit means responsive to a respective forward and reverse position of said manual control lever for momentarily causing all of said plurality of said tone generators to simultaneously modulate the transmitter carrier wave with their respective frequencies, a forward directional control means activated in response to the positioning of the lever in its forward position for causing the transmitter to modulate the carrier wave with a distinctive code combination of frequencies from the tone generators, a reverse directional control means activated in response to the positioning of the manual control lever to its reverse designation for causing the carrier wave to be modulated by a distinct code combination of frequencies from said tone generators, a speed control circuit means responsive to the activation of a respective forward and reverse directional control means for causing the carrier wave to be modulated by successive distinct code combinations of frequencies at definite time intervals, a time delay means, said time delay means being responsive to the activation of a respective directional control means for delaying the response of the other directional control means to the positioning of the manual control means to its other directional designation, a carrier wave receiving apparatus on said locomotive, a plurality of detection means associated with the receiver, each of said detection means being actuated in response to a distinctive modulated frequency of a respective tone generator, a locomotive driving means operable to be energized for selectively driving the locomotive, an integrity checking means activated in response to the simultaneous actuation of all said detection means, and a locomotive control circuit means responsive to the reception of respective distinct code combinations as detected by the activation of respective detection means and the activated condition of said integrity checking means for selectively energizing said locomotive driving means, and a speed control means responsive to the reception of distinct code combinations as governed by said speed control transmission means for incrementally energizing said locomotive driving means.

7. In a control system for remotely controlling a locomotive from a central control office, a carrier wave transmitter in said control office, a plurality of tone generators, a manual control lever operable to be positioned in a forward and reverse position, a first circuit means responsive to a respective forward and reverse position of said manual control lever for momentarily causing all of said plurality of said tone generators to simultaneously modulate the transmitter carrier wave with their respective frequencies, a forward directional control means activated in response to the positioning of the lever in its forward position for causing the transmitter to modulate the carrier wave with a distinctive code combination of frequencies from the tone generators, a reverse directional control means activated in response to the positioning of the manual control lever to its reverse designation for causing the carrier wave to be modulated by a distinct code combination of frequencies from said tone generators, a time delay means, said time delay means being responsive to the activation of a respective directional control means for delaying the response of the other directional control means to the positioning of the manual control means to its other directional designation, a carrier wave receiving apparatus on said locomotive, a plurality of detection means associated with the receiver, each of said detection means being actuated in response to a distinctive modulated frequency of a respective tone generator, a locomotive driving means operable to be energized for selectively driving the locomotive, an integrity checking means activated in response to the simultaneous actuation of all said detection means, and a locomotive control circuit means responsive to the reception of respective distinct code combinations as detected by the activation of respective detection means and the activated condition of said integrity checking means for selectively energizing said locomotive driving means.

8. In a control system for remotely controlling a locomotive from a central control office, a carrier wave transmitter in said control office, a plurality of tone generators, a manual control lever operable to be positioned in a forward, off and reverse position, a first circuit means responsive to a respective forward and reverse position of said manual control lever for momentarily causing all of said plurality of said tone generators to simultaneously modulate the transmitter carrier wave with their respective frequencies, a forward directional control means activated in response to the positioning of the lever in its forward position for causing the transmitter to modulate the carrier wave with a distinctive code combination of frequencies from the tone generators, a reverse directional control means activated in response to the positioning of the manual control lever to its reverse designation for causing the carrier wave to be modulated by a distinct code combination of frequencies from said tone generators, a forward and reverse restoration means, a time delay means, said time delay means being responsive to the activation of a respective directional control means for delaying the response of the other directional control means to the positioning of the manual control means to its other directional designation, a restoration circuit means including a respective activated forward and reverse restorer means for deactivating said time delay means in response to the positioning of the manual control lever from a respective forward and reverse designation of the off designation and back to the same respective designation, a carrier wave receiving apparatus on said locomotive, a plurality of detection means associated with the receiver, each of said detection means being actuated in response to a distinctive modulated frequency of a respective tone generator, a locomotive driving means operable to be energized for selectively driving the locomotive, an integrity checking means activated in response to the simultaneous actuation of all said detection means, and a locomotive control circuit means responsive to the reception of respective distinct code combinations as detected by the activation of respective detection means and the activated condition of said integrity checking means for selectively energizing said locomotive driving means.

9. In a control system for remotely controlling a locomotive from a central control office, a carrier wave transmitter in said control office, a plurality of tone generators, a manual control lever operable to be positioned in a forward and reverse position, a first circuit means responsive to a respective forward and reverse position of said manual control lever for momentarily causing all of said plurality of said tone generators to simultaneously modulate the transmitter carrier wave with their respective frequencies, a forward directional control means activated in response to the positioning of the lever in its forward position for causing the transmitter to modulate the carrier wave with a distinctive code combination of frequencies from the tone generators, a reverse directional control means activated in response to the positioning of the manual control lever to its reverse designation for causing the carrier wave to be modulated by a distinct code combination of frequencies from said tone generators, a speed control circuit means responsive to the activation of a respective forward and reverse directional control means for causing the carrier wave to be modulated by successive distinct code combinations of frequencies at definite time intervals, a time delay means, said time delay means being responsive to the activation of a respective directional control means for delaying the response of the other directional control means to the positioning of the manual control means to its other directional designation, a time delay restoration means responsive to the positioning of the lever from a respective forward and reverse designation to the off designation and back to the same directional designation for deactivating said time delay means, a carrier wave receiving apparatus on said locomotive, a plurality of detection means associated with the receiver, each of said detection means being actuated in response to a distinctive modulated frequency of a respective tone generator, a locomotive driving means operable to be energized for selectively driving the locomotive, an integrity checking means activated in response to the simultaneous actuation of all said detection means, and a locomotive control circuit means responsive to the reception of respective distinct code combinations as detected by the activation of respective detection means and the activated condition of said integrity checking means for selectively energizing said locomotive driving means, and a speed control means responsive to the reception of distinct code combinations as governed by said speed control transmission means for incrementally energizing said locomotive driving means.

10. A remote control system for a power unit of a locomotive comprising code transmitting means at a control office for transmitting radiated energy modulated by selected tones of a plurality of generated tones, tone selecting means at the control office for selecting different combinations of tones for transmission in response to the manual designation of distinctive operating controls for said power unit, and code receiving means on the locomotive for receiving the tones communicated from the control office, said code receiving means being distinctively conditioned in response to the respective tones received, said code transmitting means being effective to initially transmit all of said generated tones in response to the designation of any one of several of said respective operating controls for said power unit, said code receiving means on the locomotive being rendered effective to control said power unit in accordance with selected tones received only provided that said receiving means has first received all of said generated tones.

11. A remote control system for a power unit of a locomotive according to claim 10, wherein the code transmitting means is effective in response to the designation of a control for the power unit to first transmit all of the generated tones substantially simultaneously and then transmit less than the total number of tones generated as a code selected in accordance with said tone selecting means.

12. A remote control system for a power unit of a locomotive according to claim 10 wherein relays are used for selecting the tones.

13. A remote control system for a power unit of a locomotive according to claim 11 wherein relays are used to select the duration of the transmission simultaneously of all of the tones generated.

14. In a system for controlling a multiple speed trimming locomotive from a remote location, means on the locomotive for selecting distinct speeds for the locomotive, receiving means on the locomotive effective to distinctively operate said selection means as governed by the reception of a carrier wave modulated by one or more distinct frequencies, a transmitter at the remote location for transmitting said carrier wave, a plurality of tone generators at the remote location operable to individually and simultaneously modulate said carrier wave with distinctive frequencies, a forward and reverse manual control means at the remote location, a forward control relay operated in response to the forward control means for causing said tone generators to modulate said carrier wave to operate the locomotive in a forward direction, a reverse control relay operated in response to the reverse control means for causing said tone generators to modulate said carrier wave to operate the locomotive in a reverse direction, a plurality of speed control timing relays, circuit means responsive to the control means and a respective control relay for operating each one of said speed control timing relays in sequence at spaced time intervals, the operation of each of said speed control timing relays being effective to modulate said carrier wave by a new combination of distinct frequencies for incrementally changing the speed of the locomotive in each direction.

15. A system for controlling remotely a locomotive in opposite directions by the reception of distinctive signals transmitted to the locomotive by a transmitter located in the control office, comprising a control lever at the control office capable of being positioned selectively to forward, off and reverse designations, a forward directional control means effective when activated by the positioning of said lever to its forward designation to operate the transmitter to control the locomotive in a forward direction, a reverse directional control means effective when activated by the positioning of said lever to its reverse designation to operate the transmitter to control the locomotive in a reverse direction, a time delay means activated in response to the activation of one of said directional control means for delaying the activation of the other directional control means upon the positioning of said lever to its other designation, restoration means operative upon the activation of said time delay means and one of said directional control means to render said time delay means ineffective in delaying the response of said directional control means upon the positioning of said lever from either said forward and reversed designations to the off designation and back to the same designation.

References Cited in the file of this patent

UNITED STATES PATENTS

| Number | Name | Date |
|---|---|---|
| 1,747,041 | Alexanderson | Feb. 11, 1930 |
| 1,786,815 | Aspinwall | Dec. 30, 1930 |
| 1,816,628 | Williams | July 28, 1931 |
| 1,974,439 | Young | Sept. 25, 1934 |
| 2,397,475 | Dinga | Apr. 2, 1946 |
| 2,522,893 | Purington | Sept. 19, 1950 |
| 2,529,804 | Harnischfeger et al. | Nov. 14, 1950 |
| 2,573,442 | Hines | Oct. 30, 1951 |
| 2,603,434 | Merrill | July 15, 1952 |
| 2,721,300 | Myles | Oct. 18, 1955 |
| 2,786,938 | Coley et al. | Mar. 26, 1957 |
| 2,794,117 | Rees et al. | May 28, 1957 |
| 2,858,773 | Eldridge | Nov. 4, 1958 |
| 2,883,521 | Curry | Apr. 21, 1959 |
| 2,951,452 | Karlet | Sept. 9, 1960 |